Dec. 8, 1931.  A. F. KUESTER  1,835,653
TRAILER
Filed July 16, 1930
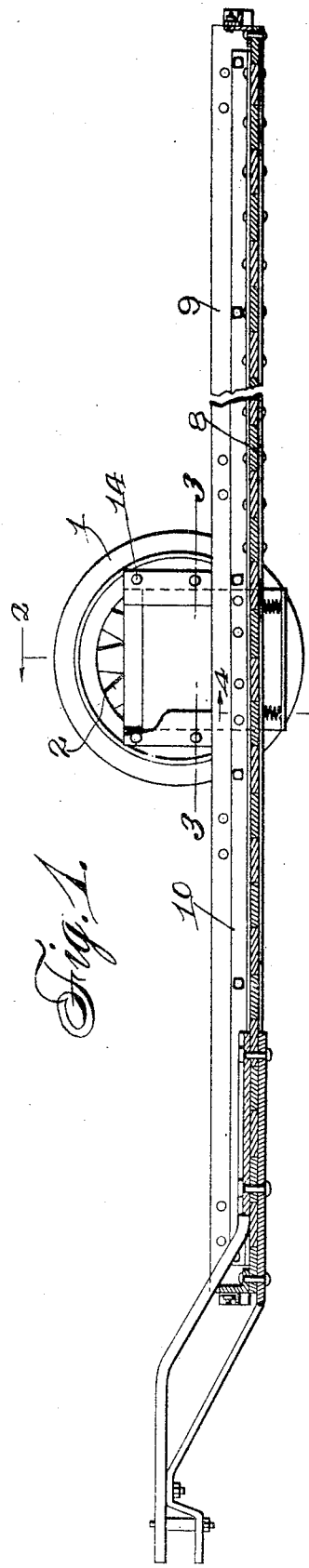
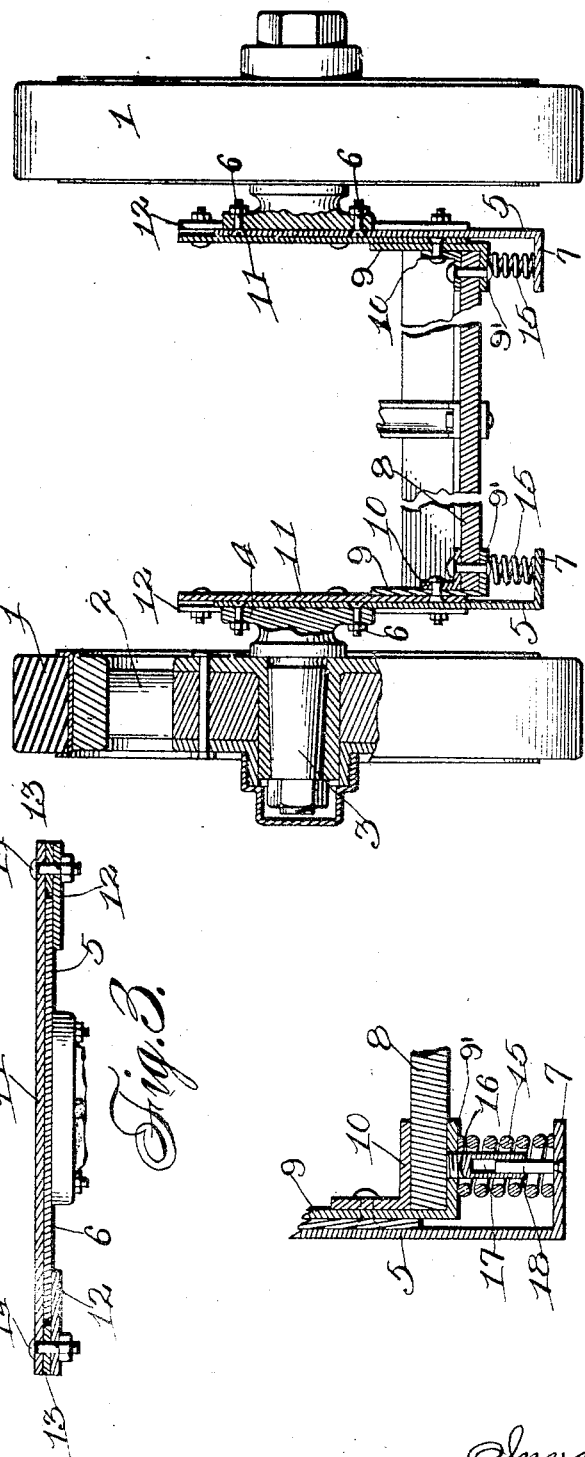
Inventor
August F. Kuester
By Young & Young
Attorneys Patented Dec. 8, 1931

1,835,653

UNITED STATES PATENT OFFICE

AUGUST F. KUESTER, OF CLINTONVILLE, WISCONSIN

TRAILER

Application filed July 16, 1930. Serial No. 468,250.

This invention relates to improvements in trailers and particularly to the low bed type of trailer.

One of the objects of this invention is the provision of a trailer which embodies improvements over the trailer illustrated in my co-pending application filed April 7, 1930, and bearing Serial #442,167, the improvements embodying novel means for mounting the bed of the trailer on yieldable supporting elements to relieve the body of the trailer from shock and jar when passing over uneven roadways.

Another object of the invention is the provision of an improved trailer wherein a supporting plate is attached to the spindles of the traction wheels and the body of the trailer is attached to a second plate slidably mounted with respect to the first plate with suitable spring members positioned between an angular extension on the first plate of the body of the trailer, so that the trailer body is yieldably mounted with respect to the traction wheels and thus reduce to a minimum the amount of shock and jar conveyed to the body of the trailer when the same passes over rough and uneven roads.

A further object of the invention is the provision of what is generally known as an underslung or low bed trailer, wherein the body is suspended below the supporting axles and is mounted to provide yielding movement on the part of the body when the traction wheels are passing over uneven surfaces, so that a minimum amount of the shock and jar will be conveyed to the body of the vehicle, this construction being particularly applicable to light weight trailers, although it can be used on heavy weight trailers.

With the above and other objects in view, the invention consists in the novel features of construction, the combination and arrangement of parts hereinafter more fully set forth, pointed out in the claims and shown in the accompanying drawings wherein:

Figure 1 is a longitudinal sectional view taken through my improved trailer and illustrating the application of the improvements;

Figure 2 is a section taken on the line 2—2 of Figure 1, with parts of the device illustrated in elevation;

Figure 3 is a section of the supporting member taken on the line 3—3 of Figure 1; and Figure 4 is a detail section on the line 4—4 of Figure 1.

Referring more particularly to the drawings, 1 indicates the treads of traction wheels 2, mounted upon suitable axles 3. Each axle is provided at its inner end with a disc-like head portion 4 providing an annular flange around the inner end of the axle.

In the construction illustrated in my co-pending application filed April 7, 1930, Serial #442,167, the body or platform of the trailer is rigidly connected to these disc-like head portions 4 on the axles.

In the present construction which is an improvement over the trailer illustrated in the above entitled application, a plate 5 is rigidly connected to each head 4 by means of bolts 6 and extends downwardly, as shown in Figure 2 and provided with an inwardly extending lateral portion 7.

The body or platform 8 of the trailer is provided along both sides with angular plates 9 and angular brace members 10. Bolted to the members 9 and 10 are the plates 11. Arranged behind the plates 5 and projecting beyond opposite edges thereof are the guide plates 12 and positioned between the guide plates 12 and the plates 11 are the spacing strips 13 with suitable bolts 14 passing through plates 11 and 12 and through the spacing strips 13 as shown at Figure 3, thereby providing a suitable guide through which plate 5 moves on each side of the body of the trailer.

The general construction of the body or platform of the trailer is the same as illustrated in my previous application, however, there is positioned between the lower horizontal portion 9' of plates 9 and the lateral extension 7, suitable coil springs 15 for yieldably mounting the bed or body of the trailer.

Extending downwardly from the horizontal portion 9 is an externally threaded tubular member 16 formed with a central bore 17 for receiving the upstanding pin 18 carried by the lateral extension 7. This sleeve 16 and pin 18 are positioned within the convolutions of springs 15 for retaining these springs in proper position between the axle plates and the bed or body of the trailer.

It will be apparent from the foregoing that when a heavy load is placed upon the body of the trailer, the springs 15 will have a tendency to become depressed, but as the springs are of sufficient strength to normally support the body 8 of the trailer with a light weight load thereon, the springs will absorb any shock or jar which usually is conveyed to the body of the vehicle when the traction wheels are passing over an uneven surface, due to the fact that when the wheels rise upwardly to pass over an obstruction, the springs 15 will become depressed due to the load on the body of the trailer, and when the wheels drop downwardly on the other side of the obstruction, the tension of springs 15 will prevent this jar from being conveyed to the bed or body of the vehicle.

These trailers are made in different sizes and are constructed for supporting various weights and while it has been the intention to provide these springs for use on light weight trucks, it will be apparent that the springs can be made substantially heavy to apply them to trailers of comparatively heavy construction for supporting heavy loads. This type of trailer has been found to be very useful when travelling over dirt roads, or other roads where the surface is rather uneven as the springs will absorb the shock which is usually conveyed to the bed or body of the trailer.

While I have shown and described the preferred embodiment of my invention, it will be apparent that slight changes may be made in the construction when putting the invention into practice without departing from the spirit of the same or the scope of the appended claims.

I claim:

1. A trailer of the underslung type comprising a pair of spaced brackets having inwardly directed laterally disposed flanges, supporting axles connected with the upper ends of the brackets, traction wheels upon said axles, a platform positioned between the brackets and having its side edges overlying the lateral portions of said brackets, and yieldable members positioned directly between the platform and the lateral portions of the brackets for yieldably mounting the platform relative to the traction wheels.

2. A trailer of the underslung type comprising stub axles having head portions on the inner ends thereof, supporting plates secured to said head portions and depending therefrom, inwardly directed laterally disposed flanges formed on the lower edges of the plates and extending the full length of said plates, a platform having its side edges overlying the lateral extensions, plates carried by the platform and extending above the same and arranged in facial relation to the first plates, guide strips embracing the edges of the first plates and fixed to the edges of the second plates to provide a guide for the edges of the first plates, and yieldable members positioned directly between the platform and the lateral extensions on the first plate for yieldably mounting the platform.

3. A trailer of the underslung type comprising a pair of spaced parallel side plates, stub axles secured to the outer faces of the plates adjacent to the upper ends thereof, supporting wheels upon the axles, inwardly directed lateral extensions on the lower edges of said plates extending the full length of said plates, a platform having its side edges overlying the extensions, means forming sliding connections between the platform and said plates, spring members positioned directly between the lower face of the platform and the lateral extensions, and means for retaining said springs in between the platform and the extensions.

In testimony that I claim the foregoing I have hereunto set my hand at Milwaukee in the county of Milwaukee and State of Wisconsin.

AUGUST F. KUESTER.